United States Patent [19]

Miller et al.

[11] 4,109,756

[45] Aug. 29, 1978

[54] HIGH FREQUENCY DIFFUSION MUFFLER FOR GAS JETS

[75] Inventors: Gerald Adrian Miller, Fountain Valley; John Mitchell Zabsky, Santa Ana, both of Calif.

[73] Assignee: Dresser Industries, Inc., Dallas, Tex.

[21] Appl. No.: 742,726

[22] Filed: Nov. 17, 1976

[51] Int. Cl.² .............................................. F01N 1/08
[52] U.S. Cl. ................................................... 181/266
[58] Field of Search ............... 181/230, 237, 256, 257, 181/258, 264, 265, 266, 268, 276

[56] References Cited

U.S. PATENT DOCUMENTS

| 3,255,844 | 6/1966 | Wallace | 181/268 |
| 4,006,793 | 2/1977 | Robinson | 181/266 |

FOREIGN PATENT DOCUMENTS

| 1,394,748 | 5/1975 | United Kingdom | 181/265 |

*Primary Examiner*—Robert C. Watson
*Attorney, Agent, or Firm*—Daniel Rubin

[57] ABSTRACT

A dissipative-type muffler for attenuating the high velocity discharge of a high pressure-high temperature safety valve. A path of flow constituting four stages of controlled turbulence suppressed diffusion is formed internally of the muffler extending from an intake into a plenum chamber then distributed past a plurality of parallel arranged radial diffuser flanges and an acoustical liner before exiting to atmosphere at relatively low velocity and low noise level. Laminar flow to small scale turbulence is obtained in the first stage by a jet impingement directional reversal in a controlled spacing discharge from an intake pipe within the plenum chamber. In the second stage, small scale discharge turbulence of high frequency is achieved by laminar flow induced via radial diffusion through controlled gap spacings between the diffuser flanges. Buffer plate impingement of the second stage discharge is then effected in the third stage after which high frequency noise attenuation by means of an acoustical composition is obtained in the fourth stage before existing to atmosphere.

12 Claims, 3 Drawing Figures

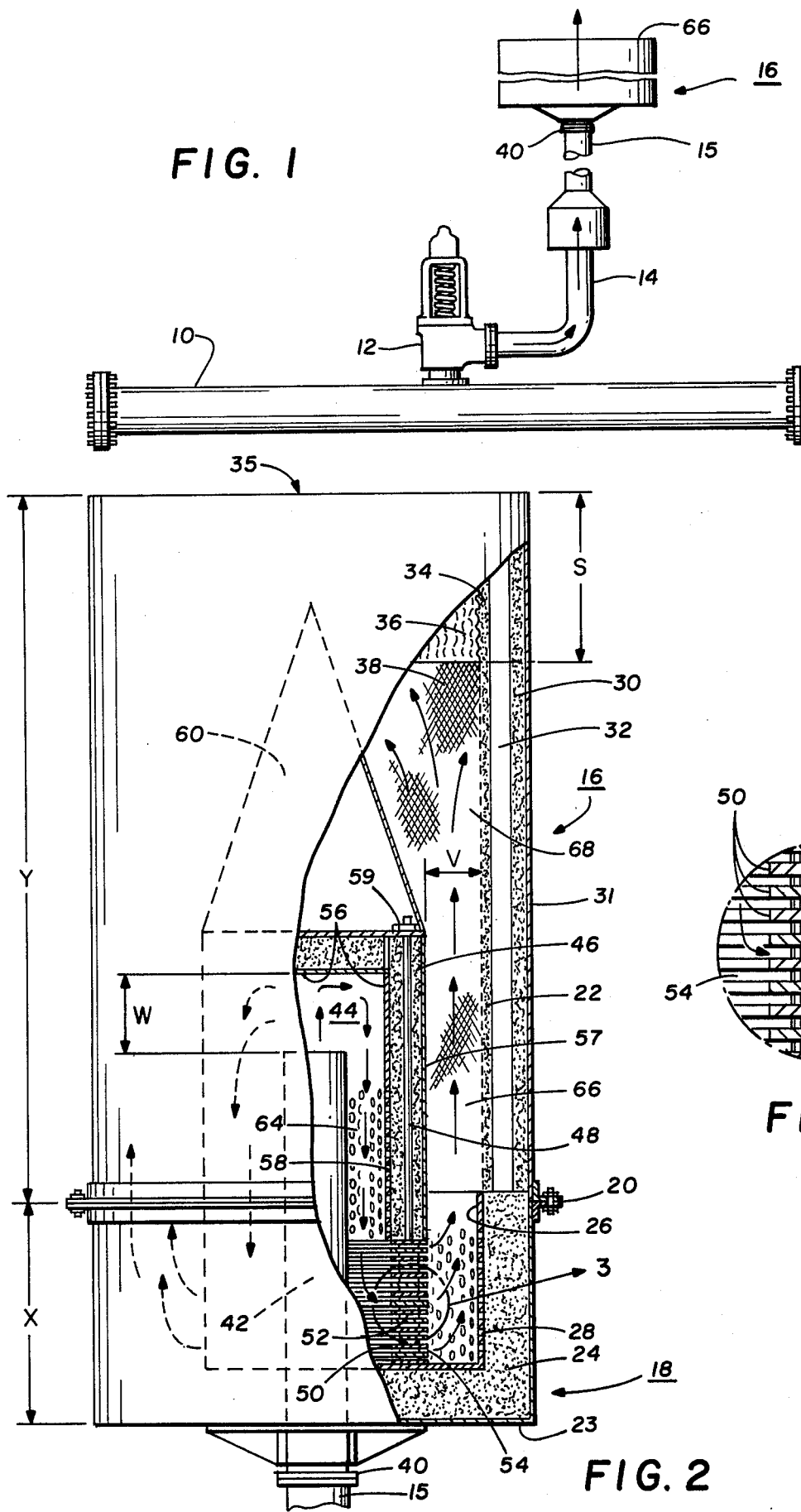

HIGH FREQUENCY DIFFUSION MUFFLER FOR GAS JETS

BACKGROUND OF THE INVENTION

1. The field of art to which the invention pertains includes the art of acoustics and mufflers for jet velocity silencing.

2. Mufflers for the purpose of silencing or suppressing equipment noise represent a well developed art and are available in an endless variety of forms to meet the abundance of applications for which they are needed. Basically, mufflers are of two basic types that include the reactive type in which geometric shapaes are utilized to reflect noise energy back to the source, and the dissipative type in which acoustical performance is obtained through the use of sound absorbing materials.

One form of equipment for which the use of mufflers has long been regarded as impractical and unnecessary is with accessory type safety equipment available to accommodate extenuating operating circumstances and which as a usual matter are infrequently operative. With such equipment being used so relatively seldom and its operation when used being of such relatively short duration, the cost for suppressing associated noises has long been regarded as economically unjustified. Exemplifying equipment of that type is a safety valve utilized, for example, on high pressure-high temperature steam service for relieving overpressure from steam generating equipment. Safety valves useful for those purposes are commercially available under the trademark CONSOLIDATED. It is not uncommon for the discharge from such high capacity safety valves to achieve sonic or near sonic velocity in the discharge duct leading to atmosphere such that not only is the duct flow transmitting noise created at the valve but at the same time is per se generating noise on discharging its flow to atmosphere.

With the advent of federal regulations enacted by the Occupational Safety and Health Administration (OSHA), a legal need has been created to significantly reduce the noise level generated by such discharging safety valves as follows:

| Duration per Day | Permissible Noise dB (A) |
|---|---|
| 8 hrs. | 90 |
| 4 hrs. | 95 |
| 2 hrs. | 100 |
| 1 hr. | 105 |
| ½ hr. | 110 |
| ¼ hr. | 115 |

While implementing requirements for the above may appear seemingly simple from the vast availability of muffler technology, it has been found that the use of conventional muffler approaches for those purposes has produced muffler equipment which is practically prohibitive in both size and weight without which an intolerable degree of back pressure is imposed on the valve. The former, of course, imposes a difficultly of accommodation, while the latter adversely affects performance of the valve and thereby at least partially defeats the safety purposes for which the valve was installed. Despite recognition of the foregoing problems, a ready solution has not heretofore been known.

SUMMARY OF THE INVENTION

The invention relates to muffler method and apparatus and more specifically to high frequency diffusion mufflers of the dissipative type useful for suppressing the noise level of a high velocity jet flow as would, for example, be experienced in the discharge from a high pressure-high temperature safety valve. Effecting the foregoing entails not only the suppression of noise level associated with such systems but effecting the desired suppression with apparatus within practical limits of size and weight while at the same time not imposing undue back pressure on the valve as might adversely affect its operating performance.

This is achieved in accordance herewith via a muffler adapted for series installation in the discharge duct downstream of the safety valve. A flow path is provided internally of the apparatus capable of maintaining the high jet noise frequency of at least the order of 2,000 Hz. By means of a four stage flow path of controlled, low level turbulence suppressed diffusion flow is carried from a plenum chamber in an impinging reverse bend flow to between parallel spaced diffuser flanges of critical gap spacing. Flow emerging from between the diffuser flanges impinges within a critical spacing against a controllably spaced buffer plate to generate small scale turbulence before passing an acoustical liner for attenuating the noise level while flow velocity is being diffused before exiting to atmosphere. By controlling the various physical spacings to within critical limits effecting laminar flow to small scale turbulence, the high noise frequency is maintained enabling optimum noise reduction with reasonable size and weight of equipment approximating ¼ to ⅓ previous volumes and 1/6 to ⅓ previous weights. At the same time, objectionable back pressure against the valve is minimized thereby eliminating the adverse effects thereof previously encountered.

It is therefore an object of the invention to provide novel muffler method and apparatus for high frequency diffusion of a high velocity gas jet.

It is a still further object of the invention to provide novel muffler apparatus for the discharge duct of a high pressure-high temperature safety valve able to effect legal noise level attenuation therefor within practical limits of equipment size and weight and without imposing undue back pressure on the valve by which performance of the valve might be adversely affected.

It is a still further object of the invention to effect the foregoing objects with an economical muffler construction in meeting safety valve OSHA criteria for effecting noise attenuation in such installations.

BRIEF DESCRIPTION OF THE DRAWINGS

FIG. 1 is essentially a schematic installation exemplifying use of the muffler method and apparatus hereof;

FIG. 2 is an enlarged elevation partially in section of muffler apparatus constructed in accordance with the invention; and FIG. 3 is an enlargement of the encircled portion of FIG. 2.

Referring now to the drawings, there is shown at 10 a pressure vessel which may, for example, be a superheater or a superheater header of a high pressure steam genertor incurring pressures to on the order of 3,000–4,000 p.s.i. with steam temperatures in excess of 1,000° F. Safety codes require that such pressure vessels be provided with a relief of overpressure by means of a safety valve 12 which when operative discharges at full capacity into a duct 14. Duct 14, in turn, connects with a duct 15 leading to atmosphere or the like and for which there is included a muffler 16 in accordance herewith.

Muffler 16, as can be best seen in FIGS. 2 and 3, is of a cylindrical configuration formed of a more or less cup-shaped lower housing portion 18 of longitudinal length X jointed via a flange 20 to an upper housing portion 22 of significantly longer longitudinal dimension Y. Forming lower housing portin 18 is a cup-shaped outer metal jacket 23 containing a composition 24 of acoustical material which in the preferred embodiment comprises stainless steel wool of medium grade. A smooth and optionally foraminous annular buffer plate 26 of corrosion and temperature resistant properties and, which may include apertures 28, internally lines composition 24 in surface contact relation with the jet flow.

Upper housing portion 22 is comprised of a metal jacket 31 containing a fiberglass sleeve 30 separated via an annular air space 32 from an internal sleeve of acoustical material 34, all extending together to exit plane 35. Composition 34 is similarly of stainless steel wool and aligns with its inside face circumferentially coincident with the inside face of composition 24. Entending inward a distance S from exit plane 35, lining composition 34 is contained within an annular rippled or protuberant face sheet 36. For the inward remainder of distance Y composition 34 is lined with an annular perforated face sheet 38 of stainless steel or the like. To connect with vent duct 15, muffler 16 includes an inlet flange 40 from which an internally extending inlet pipe 42 discharges the received valve flow at a velocity of about Mach 1.0 into a surrounding plenum chamber 44.

Forming the plenum chamber is a generally confining cylindrical structure coaxially surrounding inlet pipe 42 including an acoustical sleeve-like shroud 46 contained between a metal liner 56 and an outer metal jacket 57 and secured via a plurality of tension bolts 48 to the underside of housing jacket 23. Plate 56, on its lower half, includes apertures 58 uniformly distributed and yielding about 30 percent to 40 percent open area. The radial upper face of plate 56 is positioned a critically spaced axial distance W from the terminal inward end of pipe 42 for reasons as will be explained below. At the underside (as viewed in the drawing) of shroud 46 nearest the inlet plane are a plurality of parallel spaced radial diffuser flanges 50 separated by spacers 52 for defining a critical flow spacing 54 therebetween to be described. Supported on the top side of shroud 46 via bolts 59 is a conically extendin cone piece 60 for maintaining essentially laminar flow passing toward exit plane 35. The flow path defined by this foregoing arrangement of components includes a downward passage 64 surrounding inlet pipe 42 and leading to the transverse spacings 54 between flanges 50. From that location the flow path extends upward in passage 66 until merging with diffuser passage 68 continuing to exit plane 35.

In operation, discharge from valve 12 is conducted through ducts 14 and 15 and into muffler 16 via intake pipe 42. Emerging from pipe 42, a maintained critical spacing W causes the flow in the first stage hereof at a velocity of about Mach 1 to impinge radially against the underside of buffer plate 56 in plenum chamber 44. This produces a reverse bend in the flow path as shown by the arrows thereat. High pressure due to the 180 degree turning momentum suppresses turbulence to maintain laminar flow while directing the reduced velocity flow downward through passageway 64. At the underside of the passageway the flow turns laterally for passing through radial diffusion flanges 50 forming the second stage hereof. On emerging from the diffusion flanges at a relative velocity of about Mach 0.5 the flow is forced by virtue of critically controlled spacing V to be described and the imposed ninety degree turn to impinge against buffer plate 26. This encounter generates small scale turbulence before the flow advances upward in passage 66 constituting the third stage hereof at a relative velocity of about Mach 0.3. Following the latter impingement, flow continues upward through passage 66 toward passage 68 in the vicinity of cone 60. Thereafter, the jet velocity is essentially diffused to less than about Mach 0.3 while attenuated by the surrounding absorptive surfaces in the fourth stage hereof before being released to atmosphere at the muffler exit plane 35. If desired, further ductwork could be provided to connect exit plane 35 to atmosphere.

In the course of passing through the muffler, a jet flow entering at intake 40 at a noise level of on the order of 130 dBA can be attenuated to a noise level of about 98 dBA at exit 35. By virtue of maintaining laminar flow, high noise frequency is likewise retained throughout its flow path from pipe 42 to the exit 35. Critical to the foregoing is achieving diffused gas flow with the absence of large scale turbulence but with minimal back pressure assuring that the frequency spectrum is maintained in the high range. This entails employment of carefully controlled dimensional relationships defining the flow passages in combination with the interacting effects of fluid pressure.

Distance W between the end of pipe 42 and the top of chamber 44 is critical in that the shorter the distance the more laminar the impinging flow becomes, but if too close undesirable back pressure will result. The optimum distance W is dependent upon the mass flux resulting from the jet condition such that the greater the mass flux the greater will be the required distance to prevent back pressure since turning losses and friction increase with flow rate. For optimum results distance W should be maintained minimum without increasing back pressure, and optimum spacing was determined to be between about 2.5 – 3.5 times the internal diameter of inlet pipe 42. Distance V is similarly critical in the same sense as for spacing W in that the distance should be as short as possible and still bring about reduced velocity on the order of Mach 0.3 or less in the annulus 66.

The surfaces of flanges 50 should preferably be as smooth as can be reasonably obtained in raw unfinished metal. Spacing 54 is preferably maintained to on the order of between 0.030 and 0.060 inches although operability can be effected at gaps of up to 0.125 inches. Above this range it has been found that the output noise level was significantly compromised and below this range back pressure against valve 12 began to occur. A suitable number of slots 54 and flanges 50 are preferably chosen such that the flange discharge velocity is substantially lower than the velocity in passage 64 but still few enough in number such that plenum chamber 44 maintains a pressure somewhat above atmosphere. If the plenum chamber pressure drops too low, its acoustical impedance is adversely affected rendering the system less effective.

By the above description there is disclosed a novel method and apparatus of the dissipative type for attenuating compressible fluid jet noise ideally suited for use in the discharge duct of a high pressure-high temperature safety valve operating to relieve overpressure from a source of fluid pressure generation. In the manner of the invention, the muffler hereof achieves high frequency diffusion brought about by laminar flow and very small scale turbulence able to silence the whole spectrum of gas jets over extreme ranges of velocity, mass flow rate and temperature, and all at little or no back pressure. The high frequency diffusion in turn allows for a much lighter weight muffler than those of conventional design since the high frequency short wave length noise, regardless of intensity, can be attenuated without the use of mass such as heavy steel or lead plate barriers customarily utilized in the prior art. Whereas four stage expansion has been described as preferable for the embodiment and purposes disclosed, this is not intended as a limitation of the invention since more or less stages could be utilized as required to suit any particular application.

Since many changes could be made in the above construction and many apparently widely different embodiments of this invention could be made without departing from the scope theeof, it is intended that all matter contained in the drawings and specification shall be interpreted as illustrative and not in a limiting sense.

The embodiments of the invention in which an exclusive property or privilege is claimed are defined as follows:

1. A method for attenuating sound of a high velocity compressible fluid jet comprising the steps of:
   (a) passing said jet in a flow path through a plurality of series arranged diffusion stages in which the velocity of said jet is successively reduced;
   (b) concomitantly maintaining said jet in a condition of substantially laminar flow absent of large scale turbulence substantially throughout at least the flow path past said diffusion stages; and
   (c) exposing said jet in at least one of said stages to an acoustical absorbing composition of high frequency noise absorption properties.

2. A method for attenuating sound according to claim 1 in which the velocity of said jet is reduced from a velocity of greater than Mach 0.3 to a velocity of less than Mach Mb 0.3 in passing from the ingress to the egress of said stages.

3. A method for attenuating sound according to claim 2 in which the flow in at least one of said stages includes the step of dividing the flow into a plurality of parallel flows of controlled cross-sectional dimension.

4. A method for attenuating sound according to claim 3 in which the flow in at least one other of said stages includes the step of a forced impingement to effect a directional change in the downstream flow of the passing jet.

5. Muffler apparatus for attenuating sound of a high velocity compressible fluid jet comprising in combination:
   (a) a housing having a jet inlet and outlet;
   (b) means defining a flow path internally of said housing between said inlet and said outlet including a plurality of diffusion stages series arranged therein for successively reducing the velocity of a jet received at said inlet;
   (c) said flow path defining means being operatively effective to maintain a jet flow in a condition of substantially laminar flow absent of large scale turbulence substantially throughout at least the flow path past said diffusion stages; and
   (d) an acoustical absorbing composition of high frequency noise absorption properties exposed in said flow path in at least one of said diffusion stages.

6. Muffler apparatus according to claim 5 in which at least one of said diffusion stages includes a flange pack comprising a plurality of spaced apart diffuser flanges defining controlled conditions of flow between adjacent of said flanges.

7. Muffler apparatus according to claim 6 in which said controlled condition of flow includes a predetermined controlled spacing between adjacent of said flanges.

8. Muffler apparatus according to claim 7 in which said controlled spacing between flanges is in the range of between 0.030 inches to 0.125 inches.

9. Muffler apparatus according to claim 8 in which said controlled spacing between flanages is in the range of between 0.030 inches to 0.060 inches.

10. Muffler apparatus according to claim 7 in which the initial of said stages comprises a plenum chamber directly receiving a compressible fluid jet from said inlet and including means for changing the flow direction thereat.

11. Muffler apparatus according to claim 10 including an upstream supply pipe extending centrally inward of said plenum chamber to a predetermined terminal location and said plenum chamber includes a wall surface positioned transversely opposite the termination of said supply pipe and spaced therefrom a distance substantially in the range of 2.5 to 3.5 times the inside diameter of said supply pipe in flow impinging relation thereto.

12. Muffler apparatus according to claim 11 in which said plenum chamber defines an annular flow passage surrounding said supply pipe and said chamber wall surface is effective to reverse the direction of flow impinging thereon.

* * * * *